US006962615B2

(12) United States Patent
Staudenmayer et al.

(10) Patent No.: US 6,962,615 B2
(45) Date of Patent: Nov. 8, 2005

(54) FILTER ELEMENT, PARTICULARLY FOR SEPARATING A LIQUID FROM A GAS STREAM

(75) Inventors: Bernhard Staudenmayer, Dudenhofen (DE); Detlef Brandt, Ludwigsburg (DE); Wolfgang Heikamp, Waldsee (DE)

(73) Assignee: Mann & Hummel GmbH, Ludwigsburg (DE)

( * ) Notice: Subject to any disclaimer, the term of this patent is extended or adjusted under 35 U.S.C. 154(b) by 183 days.

(21) Appl. No.: 10/449,871

(22) Filed: Jun. 2, 2003

(65) Prior Publication Data
US 2004/0031253 A1    Feb. 19, 2004

(30) Foreign Application Priority Data
May 31, 2002   (DE) ................ 102 24 223

(51) Int. Cl.[7] .......................... B01D 39/20; B01D 46/02
(52) U.S. Cl. ...................... 55/486; 55/487; 55/495; 55/498; 55/501; 55/503; 55/505; 55/525; 55/527; 55/DIG. 17
(58) Field of Search .............. 55/486, 487, 495, 55/497, 498, 499, 501, 503, 505, 522, 525, 55/527, DIG. 17

(56) References Cited

U.S. PATENT DOCUMENTS

| 4,144,040 | A | * | 3/1979 | Claes et al. ............... 55/487 |
| 4,322,385 | A | * | 3/1982 | Goetz ....................... 55/487 |
| 4,915,714 | A | * | 4/1990 | Teague et al. ............. 55/486 |
| 5,252,207 | A | * | 10/1993 | Miller et al. ............. 55/487 |
| 5,605,748 | A | * | 2/1997 | Kennedy et al. ........... 55/486 |
| 5,702,494 | A | * | 12/1997 | Tompkins et al. .......... 55/498 |
| 5,759,219 | A | * | 6/1998 | Rink et al. ................ 55/486 |
| 5,814,118 | A | * | 9/1998 | Wickland et al. .......... 55/486 |
| 6,171,369 | B1 | * | 1/2001 | Schultink et al. ......... 55/487 |
| 6,514,325 | B2 | * | 2/2003 | Cox et al. ................. 55/486 |
| 6,527,839 | B2 | * | 3/2003 | Fornof et al. ........ 55/DIG. 17 |
| 6,733,575 | B1 | * | 5/2004 | Lefever et al. ............ 55/527 |

FOREIGN PATENT DOCUMENTS

| EP | 0 674 582 B1 | * | 8/1996 | .......... B01D 39/20 |
| EP | 0 639 398 B1 | * | 5/1997 | .......... B01D 39/20 |

* cited by examiner

Primary Examiner—Duane Smith
Assistant Examiner—Jason M. Greene
(74) Attorney, Agent, or Firm—Crowell & Moring LLP

(57) ABSTRACT

A filter element composed of a nonwoven filter web of metal fibers affixed to a support body, in which the metal fibers of the filter web form an unsintered composite having a porosity of at least 90%. Preferably the metal fibers have a diameter of at most 4 µm.

13 Claims, 2 Drawing Sheets

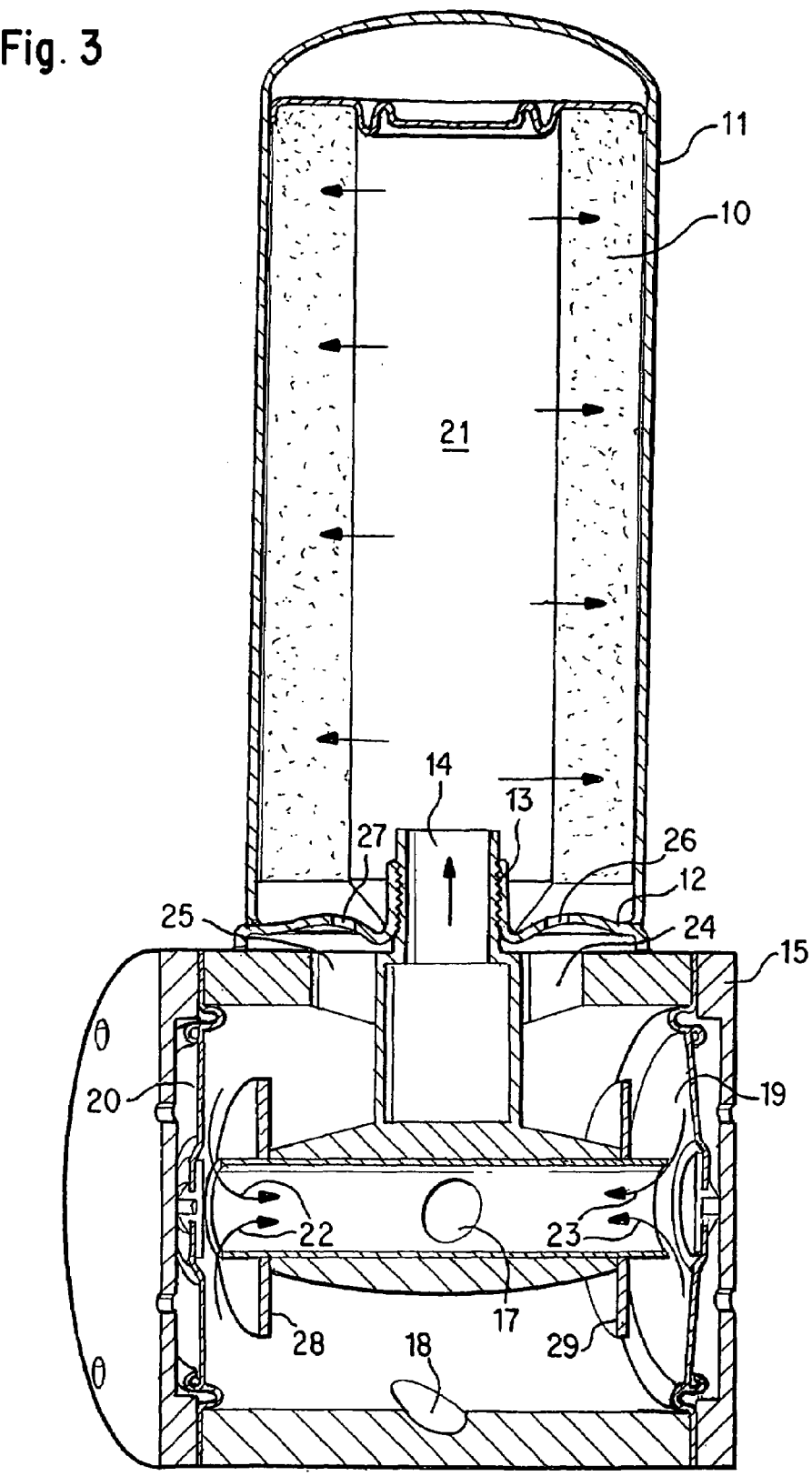

FILTER ELEMENT, PARTICULARLY FOR SEPARATING A LIQUID FROM A GAS STREAM

Figure 1:
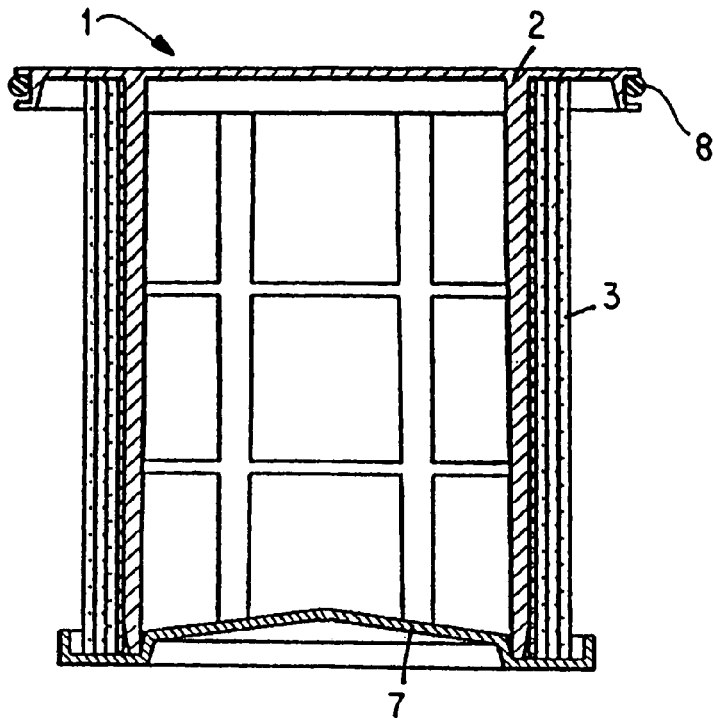

The invention relates to a filter element, particularly for separating a liquid from a gas stream as described hereinafter.

European Patent EP 0 674 582 B1 describes such a filter element, which is made of a nonwoven filter fabric with metal fibers sintered together under pressure and a metal wire mesh as a support structure to support the nonwoven filter fabric. The sintering process causes the metal fibers, which are at least 8 µm thick, to bake together, resulting in a comparatively low porosity of 40% maximum. This porosity is sufficient to filter untreated particle-laden air or other gaseous media, since the gas is capable of flowing through the gaps in the nonwoven filter fabric while avoiding an impermissibly high backpressure. Liquid media, however, cannot be filtered or can be filtered only to a limited degree. The relatively high density of the nonwoven filter fabric allows the liquid to flow through only at a relatively high backpressure, which cannot normally be produced or which can damage the nonwoven filter fabric.

European Patent EP 0 639 398 B1 also describes a nonwoven filter fabric made of metal fibers, in which the metal fibers are supposed to have a diameter of 5 to 40 µm. The filter element is preferred for cleaning diesel exhausts; the nonwoven metal filter separates the soot particles from the exhaust. Due to its relatively high density, this nonwoven filter fabric, too, has only limited usefulness in the cleaning of contaminated liquids.

The object of the invention is to provide a filter element, particularly for separating a liquid from a gas stream, which is distinguished by its simple construction and high efficiency and, at the same time, low backpressure.

This object is attained according to the invention by the features as described hereinafter. Advantageous further embodiments are also described hereinafter.

In the filter element according to the invention, the metal fibers in the nonwoven filter fabric form an unsintered composite. The metal fibers have a diameter ranging from 1.5 to 10 µm. In preferred embodiments, the metal fibers have a diameter of less than 4 µm or even less than 2 µm.

The nonwoven filter fabric has a porosity of at least 90%, advantageously even at least 98% or at least 99%. This high porosity ensures that the medium to be filtered can flow through the nonwoven filter fabric with a low backpressure. As a result, especially if the filter element is used in a crankcase ventilation device, the separation of oil droplets in the oil-air mixture in the crankcase can be substantially improved without significant pressure loss. Due to the high separation efficiency of the nonwoven filter fabric, subsequent separation or a subsequent nonwoven drainage fabric is unnecessary. Not only is the non-woven filter material highly efficient, it is also distinguished by a low affinity for soot. Furthermore, the nonwoven filter material does not get saturated with oil, so that it is not likely to get clogged with oil droplets.

A further advantage results from the cotton wool-like consistency and the low density of the filter fabric. This makes it possible to shape the nonwoven filter fabric without impairing its filtration properties and to adapt it to the structural conditions of the filter system.

The support element on which the nonwoven filter fabric is mounted and with which it is joined imparts the required stability to the filter element and, in particular, is capable of transmitting tensile forces, possibly also pressure forces, which act orthogonally to the flow direction through the filter. To minimize the pressure loss between the unfiltered and the filtered side and to avoid interference with the separation on the filter element, the support element preferably has a maximum thickness of 0.1 mm and in addition or as an alternative thereto can have a maximum basis weight of 10 g/m$_2$. The support element can also have a nonwoven-type structure, particularly a lattice structure, to minimize interference with the flow of the medium to be filtered.

Embodiments with a single nonwoven filter layer as well as embodiments with several nonwoven filter layers are possible. In a multilayer embodiment, each nonwoven filter layer can have metal fibers of the same diameter, e.g., a diameter of 4 µm. However, the metal fiber diameters of the nonwoven filter layers can also differ, which may enhance the separation efficiency. A three-layer structure in which the two outer layers have metal fibers with a diameter of 4 µm and the center layer has metal fibers with a smaller diameter, particularly a diameter of 2 µm, have proven to be advantageous.

Within a nonwoven filter layer, the metal fibers advantageously have the same diameter. However, it can also be advantageous to use metal fibers of different diameters within the same nonwoven filter layer.

The support element is advantageously made of plastic, possibly glass or some other material. In particular, the support element forms an outer layer of the nonwoven filter fabric or the composite of several nonwoven filter layers, preferably on the outflow side. It is also possible, however, to integrate the support layer in a nonwoven filter fabric or to arrange the support layer between two adjacent layers of nonwoven filter fabric.

The support element and the nonwoven filter fabric are preferably joined by ultrasonic welding.

The filter element can have the shape of a cylinder, especially a hollow cylinder, or it can be a flat filter with a layered sandwich structure. The filter element may also be wave-shaped or pleated, if indicated.

Figure 2:
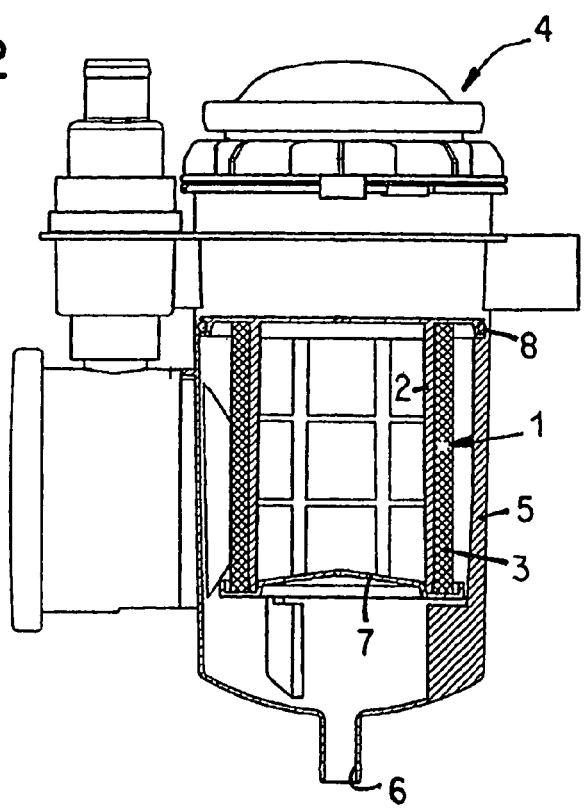

Further advantages and suitable embodiments are set forth in the claims, the description of the figures and the drawings, in which:

FIG. 1 is a section through a hollow cylindrical filter element with an interior support element and a composite of three superimposed layers of a nonwoven filter fabric applied to the outer lateral surface of the support element, FIG. 2 shows a separator for crankcase ventilation with an inserted filter element, and FIG. 3 shows a separator with a box-type filter element.

The filter element 1 depicted in FIG. 1 comprises a support element 2 in the shape of a hollow cylinder and a plurality of nonwoven filter layers 3, which are wrapped around the cylindrical exterior surface of the support element 2. Each nonwoven filter layer is made of metal fibers with a maximum diameter of 4 µm, which form an unsintered composite and thus have a high porosity of at least 90%, possibly even greater than 99%. Within a nonwoven filter layer, metal fibers of preferably the same diameter are arranged. Different nonwoven filter layers can have metal fibers of a different diameter or even of the same diameter. This makes it possible, in particular, to combine different nonwoven layers with diameters of 4 µm and 2 µm to improve the separation efficiency. The figure shows a total of three superimposed nonwoven filter layers.

In a multi-layer embodiment with at least two nonwoven filter layers, the separation efficiency can be influenced by the selection of the metal fibers used in each layer. A further means for adjustment is the winding force with which each nonwoven filter layer is wound around the support element. Due to the compressibility of the nonwoven filter fabric, the winding force influences the density and thus also the separation efficiency of the nonwoven fabric.

The support element is made of glass or plastic and is joined to the nonwoven filter fabric directly supported thereon by means of ultrasonic welding or some other joining technique. The medium to be filtered, particularly an oil-air mixture, preferably flows through the filter element 1 in radial direction from the outside toward the inside. During this process, the oil particles are separated, and the air flows into the interior of the cylinder. From there it is removed in axial direction.

It may also be advantageous to let the air flow through the filter element in the opposite direction, i.e., radially from the inside toward the outside, so that the unfiltered side is in the interior of the cylinder space and the filtered side is radially on the outside of the filter element.

FIG. 2 shows a separator 4 that is used, in particular, for crankcase ventilation. A filter element 1 with the support element 2 and with at least one nonwoven filter fabric 3 is inserted into a housing 5 of the separator 4. The air flows through the filter element 1 in radial direction from the outside toward the inside. The unfiltered side located radially on the exterior communicates with a discharge opening 6 in the floor of the housing 5 of the separator 4, through which the separated oil can be discharged from the separator. The filtered air is guided axially through the filtered side in the interior toward the top. On the bottom of the filter element 1, a bottom plate 7 connected with the support element 2 separates the filtered side from the unfiltered side underneath it. With the aid of a sealing ring 8, which is seated in a receiving groove in a lid section of the support element 2, the interior of the filter element is sealed from the unfiltered side in upward direction in a flow-tight manner.

The metal fibers can be made of metal alloys and, in a first embodiment, can have the following composition: maximum 0.03% C, average 2% Mn, average 0.045% P, average 0.03% S, average 1% Si, average 16% to maximum 18% Cr., average 10% to maximum 14% Ni and average 2% to maximum 3% Mo. The filtration rate for liquids is 2 $\mu$m and for gases 0.1 $\mu$m at a maximum temperature of 350° to 380° C.

In a further embodiment, the composition is as follows: maximum 0.1% C, 21% to 25% Cr, 58% to 63% Ni and maximum 1.4% Al. The filtration rate for liquids is 20 $\mu$m and for gases 7 $\mu$m at a maximum temperature of 560° C.

In yet another embodiment, the composition is as follows: maximum 0.3% Co, 22% to 24% Cr, 15% to 16.5% Mo, maximum 1.5% Fe, maximum 0.01% C, maximum 0.1% Si, maximum 0.5% Mn, 0.1% to 0.4% Al, maximum 0.015% P, maximum 0.005% S. This composition is distinguished by its high corrosion resistance against sulfuric acid. The filtration rate for liquids is 15 $\mu$m and for gases 5 $\mu$m at a maximum temperature of 600° C.

In yet another embodiment, the composition is as follows: 19.5% to 20.5% Cr, maximum 0.03% C, maximum 0.35% Si, maximum 0.35% Mn, 4.55% to 4.95% Al, maximum 0.035% P, maximum 0.01% S, maximum 0.35% Ni, maximum 0.15% Cu, 0.25% to 0.3% Y. This composition is distinguished by its high corrosion resistance against sulfur and sulfur components. The filtration rate for liquids is 35 $\mu$m and for gases 10 $\mu$m at a maximum temperature of 1000° C.

FIG. 3 shows a separator element in a cartridge configured as a box-type filter. The oil separator element 10 is arranged in a cup-type housing 11. On the bottom, this cup-type housing 11 is sealed with a lid 12. The housing 11 is joined to the lid 12 by means of a flared flange. This lid 12 has a threaded bushing 13. With this threaded bushing 13 the entire filter element is screwed onto a threaded connection piece 14. The threaded connection piece 14 forms part of a module carrier 15. This module carrier 15 has three connections: an inflow opening 16, an outflow opening 17 and a discharge opening 18. In addition, two suction relief valves 19, 20 are arranged in the module carrier 15.

The oil-containing air flows through the inlet opening 16 into the inlet chamber 21.

From the inlet chamber 21, the air flows in the direction of the arrow through the oil separator element 10 containing the nonwoven filter fabric according to FIG. 2. The de-oiled air exits from the housing 11 of the box-type filter through the openings 26, 27. The housing 11 is sealingly connected with the module carrier 15. As a result, the de-oiled air, which exited from the housing through the openings 26, 27, flows through the openings 24, 25 into the module carrier 15. The de-oiled air is guided to the outflow opening 17 in the direction of the arrows 22, 23.

The oil collecting in the oil separator element 10, like the de-oiled air, reaches the module carrier 15 through the openings 26, 27 or 24, 25. Here, the oil collects on the bottom and flows out through the discharge opening 18. Disks 28, 29 are provided to prevent the oil reaching the module carrier 15 through the openings 24, 25 from being entrained by the de-oiled air stream to the outflow opening 17. These disks 28, 29 collect the oil and allow it to flow off in the direction of the discharge opening 18. To replace the oil separator element 10, the threaded connection piece 14 simply has to be unscrewed. This has the advantage that connections or other valves do not need to be unscrewed or replaced. Furthermore, no additional clearance is required for removal.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element for separating a liquid from a gas stream, said filter element comprising three superposed nonwoven metal fiber filter web layers affixed to a support body, wherein the metal fibers in at least two of the nonwoven web layers have different fiber diameters in the range from 1.5 $\mu$m to 10 $\mu$m and form an unsintered composite having a porosity of at least 90%, the outer layers being formed of metal fibers having a fiber diameter of at most 4 $\mu$m, and the middle layer being formed of metal fibers having a fiber diameter of at most 2 $\mu$m.

2. A filter element according to claim 1, wherein the metal fibers in the outer layers have a fiber diameter of about 4 $\mu$m.

3. A filter element according to claim 1, wherein the nonwoven web of metal fibers has a porosity of at least 98%.

4. A filter element according to claim 1, wherein the support body has a thickness of at most 0.1 mm.

5. A filter element according to claim 1, wherein the support body has a basis weight of at most 10 g/m$^2$.

6. A filter element according to claim 1, wherein the support body is composed of a synthetic resin material.

7. A filter element according to claim 1, wherein the support body is composed of glass.

8. A filter element according to claim 1, wherein the support body has a lattice structure.

9. A filter element according to claim 1, wherein the support body is configured as a hollow cylinder, and the nonwoven filter web is wound around the outer circumference of the support body.

10. A filter element according to claim 1, wherein the support body and the nonwoven filter web are ultrasonically welded to each other.

11. A filter element according to claim 1, wherein said filter element is an exchangeable replacement filter element.

12. A filter element according to claim 11, wherein the replacement filter element is received in a housing, and said housing is releasably attached to a filter base.

13. A filter element according to claim 12, wherein said housing is attached to the filter base by screw threads.

* * * * *